(12) United States Patent
Bietenhader

(10) Patent No.: US 6,176,679 B1
(45) Date of Patent: Jan. 23, 2001

(54) ROTOR WITH FOLDING BLADES, FOR THE ROTARY WINGS OF AN AIRCRAFT

(75) Inventor: Claude Bietenhader, Lambesc (FR)

(73) Assignee: Eurocopter, Marignane Cedex (FR)

( * ) Notice: Under 35 U.S.C. 154(b), the term of this patent shall be extended for 0 days.

(21) Appl. No.: 09/006,504

(22) Filed: Jan. 14, 1998

(30) Foreign Application Priority Data

Jan. 17, 1997 (FR) .................................................. 97 00475

(51) Int. Cl.$^7$ .................................................. B64C 27/50
(52) U.S. Cl. ...................................... 416/143; 416/134 A
(58) Field of Search .................................. 416/142, 143, 416/141, 134 A, 87, 89

(56) References Cited

U.S. PATENT DOCUMENTS

| | | | |
|---|---|---|---|
| 3,743,441 | 7/1973 | Ferris | 416/143 |
| 4,268,222 | * 5/1981 | Bernard | 416/143 |
| 5,211,538 | 5/1993 | Seghal et al. | 416/142 |

FOREIGN PATENT DOCUMENTS

| | | |
|---|---|---|
| 0 057 053 | 1/1982 | (EP) . |
| 1 136 858 | 5/1957 | (FR) . |
| 2 158 542 | 6/1973 | (FR) . |

* cited by examiner

*Primary Examiner*—Edward K. Look
*Assistant Examiner*—Richard Woo
(74) *Attorney, Agent, or Firm*—Henderson & Sturm LLP

(57) ABSTRACT

The rotor comprises a hub 2 rotated with a mast 1 about an axis of the rotor ZZ, and each blade 3 is connected to the hub 2 by a member 5 on which the blade 3 is mounted so that the blade 3 can pivot about an axis of folding BB between a flight position and a folded-back position. The axis of folding BB is in a substantially radial plane passing through the axis of the rotor ZZ and is inclined with respect to this axis of the rotor ZZ so that it converges towards it, on the opposite side to the rotor mast 1. In automatic folding, the blade 3 is held in a fitting 6 pivoting on the member 5 about the axis of folding BB, whereas in manual folding, the blade 3 is held on the member 5 by two pins 8, one of which is removable to allow the blade to be folded about the other pin 8, the longitudinal axis of which is the axis of folding BB inclined in the radial plane.

12 Claims, 7 Drawing Sheets

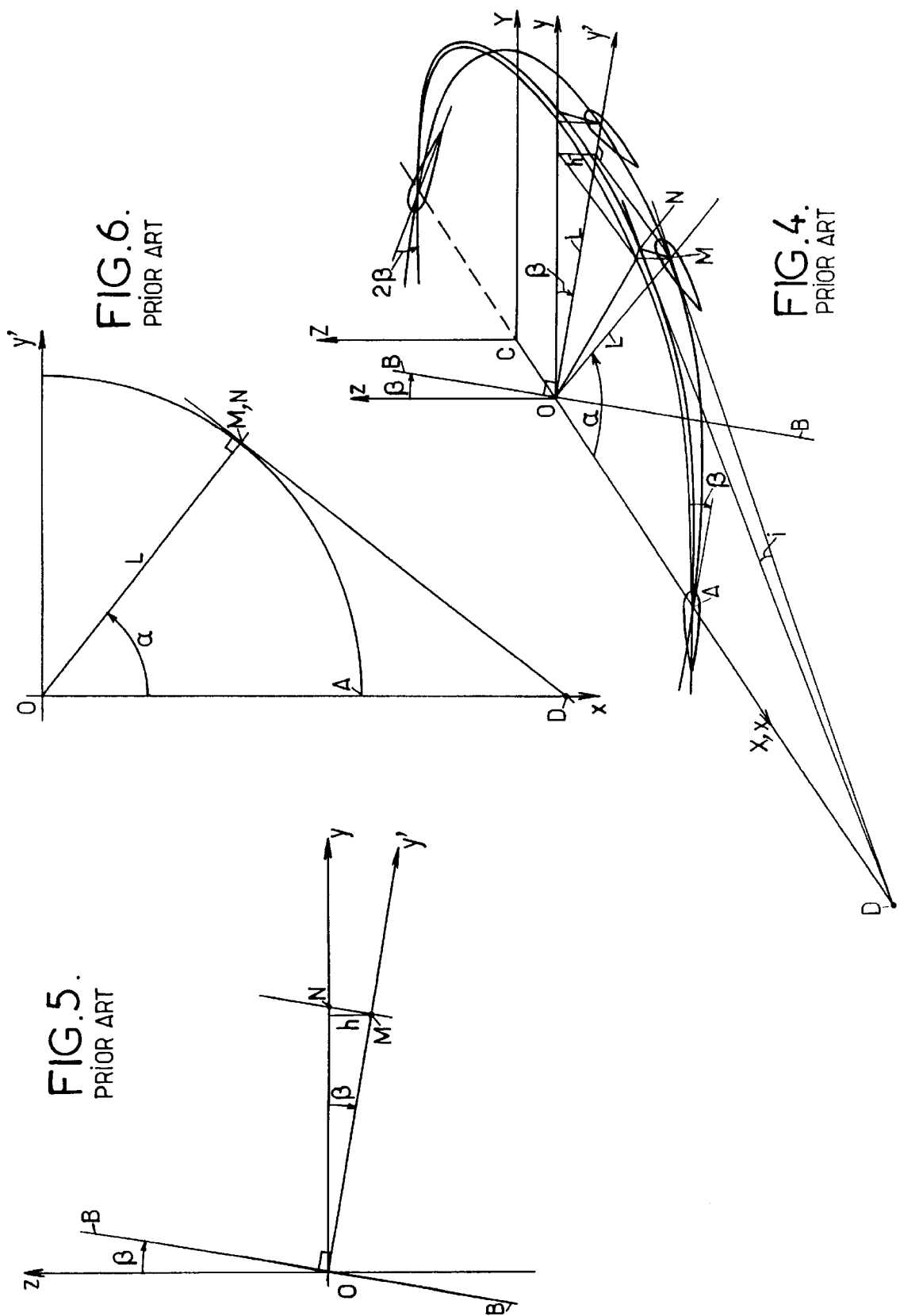

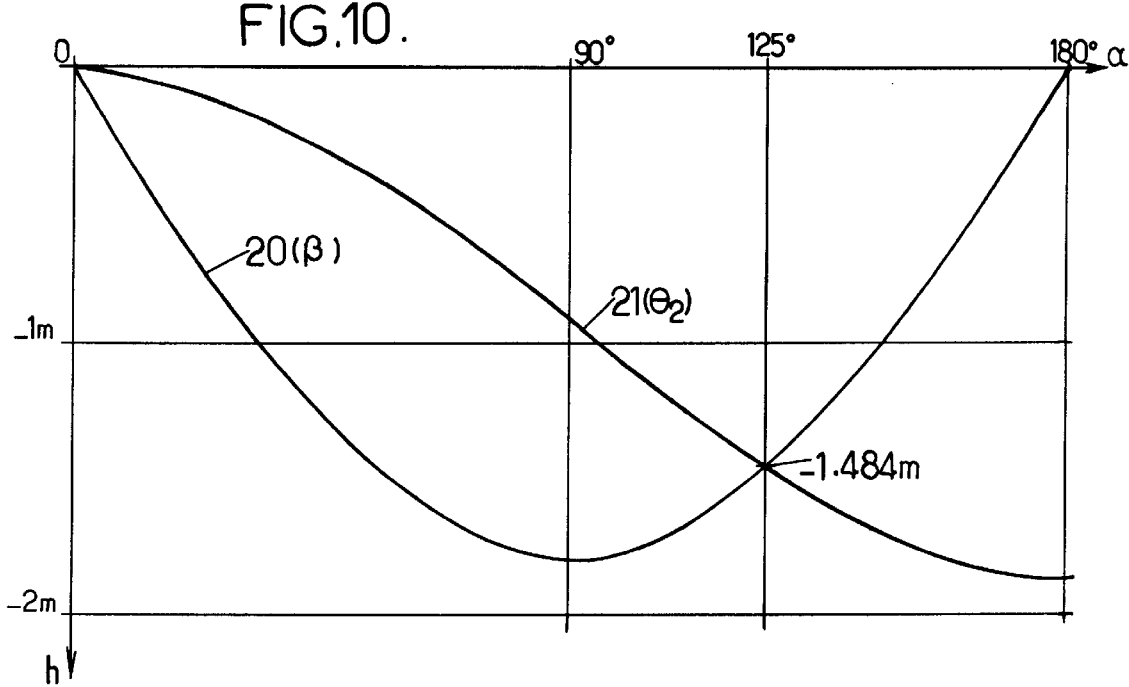
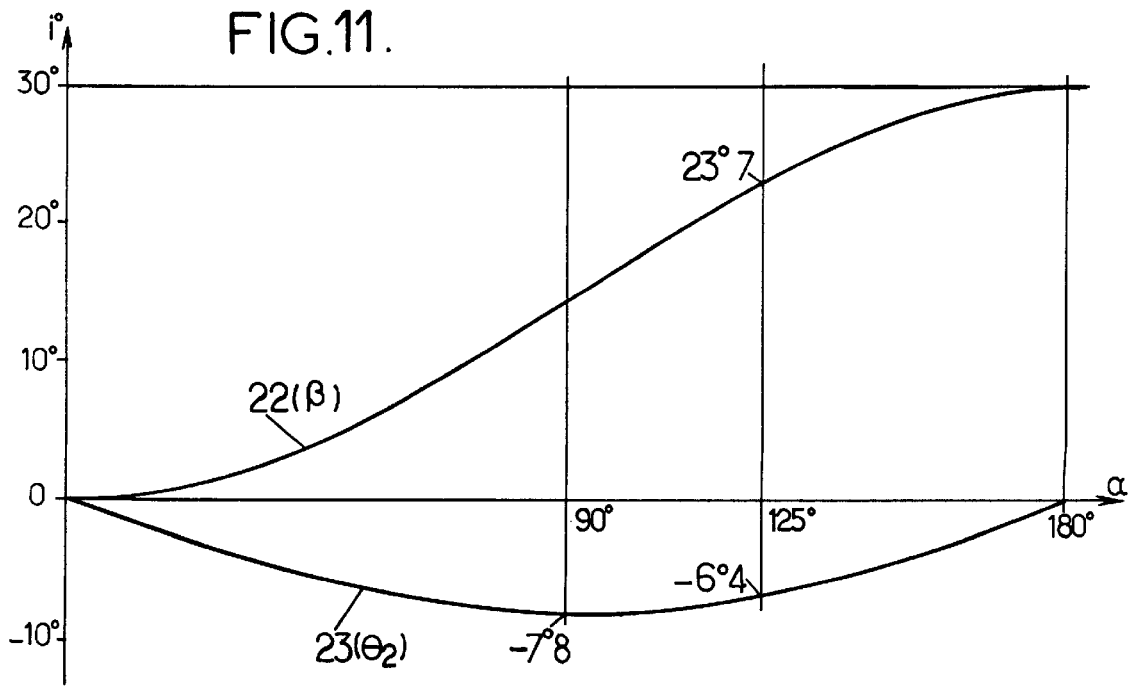

ROTOR WITH FOLDING BLADES, FOR THE ROTARY WINGS OF AN AIRCRAFT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates to a rotor with folding blades for the rotary wings of an aircraft, and in particular for a helicopter main rotor.

The rotor with folding blades according to the invention is of the type comprising a hub, secured to a rotor mast, generally at one end of the mast, intended to be rotated about an axis of the rotor, and to which each blade of the rotor is connected by a connecting member which is substantially radial with respect to the axis of the rotor, the connecting member being itself connected to the hub by retaining and articulating means allowing angular excursions of the corresponding blade with respect to the hub at least in terms of pitch about a longitudinal pitch-change axis of the blade, each blade being mounted so that it can pivot with respect to the corresponding connecting member about an axis of folding, so that it can be moved, when the rotor is stopped, between two positions, one of which is a flight position, in which the blade is substantially radially in line with the connecting member, and the other of which is a folded position, in which the blade is pivoted about the axis of folding to one side of the connecting member towards the rear of the aircraft.

When the latter is a helicopter, the blades of its main motor may thus be folded backwards, on each side of the rear part of the fuselage and of the tail boom of the helicopter, with the possible exception of one of the blades of the rotor which, when the rotor has an odd number of blades, can be aligned on its pitch axis with the longitudinal axis of the helicopter and directed towards the rear of the latter without needing to be folded.

2. Description of the Prior Art

In general, the blades of a helicopter main rotor are folded in order to reduce the overall size of the helicopter, in typical usage scenarios, especially in use on land to facilitate and optimize the storage of the helicopter in a hangar, with a particular importance in the case of small hangars in cold countries and, in military applications, to make it easier to hide the helicopter under camouflage or under the cover of trees, and to make it easier to load the helicopter into the hold of an aeroplane or, when used on board a ship, to fit inside the lifts of aircraft carriers and/or to be compatible with a hangar adjacent to the helicopter deck on the ship.

Folding can be done manually, by operators using implements for moving and positioning or lashing down the blades, such as poles fitted with grippers for lifting the blades, pivoting them and lashing them down to the tail of the helicopter, or automatically, without the assistance of people but by operating maneouvering actuators, for example electro-hydraulic or electromechanical actuators mounted on the rotor, and folding and deployment will be either manual or automatic depending, especially, on the mass of the blades and on their height relative to the ground (which determines the size and weight of the poles and the effort the operators will have to exert), the external conditions, such as wind speed and/or movements of the deck of the ship, or alternatively the time needed to clear a landing or deck-landing area of a first helicopter in order to receive a second one.

The criteria governing a folding-blade rotor are essentially the width of the rotor with the blades folded, the possibilities for lashing the folded blades to the back of the fuselage and/or to the tail boom of the helicopter, and the fitting, during folding, of the forward-pointing blades of the stationary rotor under the non-folding members of the backward-pointing blades, and in particular their members for connecting them to the hub, when the rotor has more than three blades.

Indeed, folding the blades of a three-blade rotor does not pose any particular problems, as one blade is directed backwards, over the tail boom, along the longitudinal axis of the helicopter, and each of the other two blades is folded backwards on each of the two sides of the tail boom, encountering no obstacles in their path.

By contrast, difficulties mount when the number of blades increases beyond four blades, both as regards the width of the rotor with the blades folded and as regards lashing all the blades down to the tail boom, it being possible for additional constraints to arise out of the proximity of upper covers, especially of the turbo engine unit or of jet dilution/deflection devices, or alternatively of folding the rear part of the tail boom with the counter-torque rotor, for helicopters on board ships.

A folding-blade rotor of the type introduced hereinabove, and which is folded automatically, is known from EP-A-0,057,053. In this document, the axis of folding of each blade is offset laterally with respect to the pitch axis of the blade and perpendicular to this pitch axis and vertical, like the axis of the rotor. The blades thus pivot about axes which are parallel to the axis of the rotor and this, because of the flexural deformation of the blades under the effect of their own weight and also, sometimes, of the wind and/or movements of the ship, has the drawback that it leads to interference, during folding, between the front blades and the rear blades or other members of the rotor such as the pitch rods connecting the swashplates to the blades.

In an attempt to overcome these drawbacks, it has already been proposed that the path and final position of each blade, while it is being folded, be defined by choosing an appropriate inclination for the axis of folding in a plane perpendicular to the pitch axis of the blade so as to allow blades coming from the front to pass underneath the rear blades, which should be higher up, because the rotor mast is generally inclined towards the front of the helicopter.

In a rotor with manual folding of the blades, each blade is generally held on its connecting member by means of two pins which are symmetric with respect to the pitch axis and, depending on whether the blade extends to the right or to the left, one of these two pins, which is removable, is removed so that the blade can be pivoted about the other pin which is on the side towards which the folding movement occurs. In order to obtain the desired path for each blade, one solution consists in inclining the pivot pin in a plane perpendicular to the pitch axis of the blade by rotating its member for connection to the hub about its longitudinal pitch axis, but this results in natural conflict between the front-left and front-right blades, the connecting members of which have to be rotated in opposite directions.

Other drawbacks of this known solution are that it is not clear how to find a position for the swashplates which is satisfactory for all of the blades while at the same time avoiding, in particular, having to disconnect one or more pitch rods, this being to avoid wasting time and the risk of incorrect reconnection for the flight configuration; furthermore when the means of holding and articulating to the hub provide a torsionally elastic pitch articulation, for example when these means comprise an elastomeric laminated spherical stop, or a bundle or a torsion blade, these articulation means are stressed for long periods of time by permanent twists which differ from blade to blade.

In the case of rotors in which the blades are folded automatically, it is not permitted to have to disconnect the pitch rods, and the bulk of the blade-folding mechanism and possibly of the associated mechanisms for locking the blade in terms of pitch, or even in terms of flap and/or drag for folding, near to the axis of folding of each rear blade, leads to a search for even lower positions for the front blades than are found in the case of a rotor which is folded manually. Thus, for the same initial pitch of all the blades, each member for connecting a blade to the hub needs to be designed with the desired inclination of the corresponding axis of folding in a plane perpendicular to the pitch axis.

A drawback of a solution of this kind is that the greater inclination for the front blades than for the rear blades, and the symmetry between the blades on the right and the blades on the left unavoidably means that it is necessary to have as many different connecting members as there are blades on the rotor.

Furthermore, whether the rotor blades are folded manually or automatically, the choice of appropriate angles of inclination for the axes of folding in planes perpendicular to the pitch axes of the blades leads to blade paths with steep slopes and to the folded blades presenting a large area exposed to the wind, and this limits the foldability to low wind speeds, and a complicated procedure for manual or automatic folding requiring the use of implements for manoeuvring and/or positioning the blades, such as the aforementioned poles, or a need to operate the hydraulic blade-folding actuators at high pressure.

The problem underlying the invention is that of overcoming at least one of the aforementioned drawbacks, and preferably a number of them simultaneously, in the case of manual or automatic folding, and to provide a rotor with folding blades which is better suited to the various practical requirements than those known at present.

BRIEF SUMMARY OF THE INVENTION

To this end, the rotor with folding blades according to the invention, of the type described hereinabove, is characterized in that the axis of folding of each blade is in a substantially radial plane passing through the axis of the rotor and is inclined with respect to the axis of the rotor so that it converges towards the axis of the rotor on the opposite side to the rotor mast.

This inclination of the axis of folding in a more or less radial plane (a plane containing the axis of the rotor and the pitch axis of the blade in question or parallel thereto) has a very attractive consequence of reducing the slopes of the paths of the blades. Other advantages are obtained at the same time, such as relationships governing the change in incidence of the blades during folding which lead to a reduction in the area of the folded blades exposed to the wind, and a simplification of the procedure, both for automatic folding and for manual folding, and finally a simplification of the structure of the rotor head, particularly the hub.

In particular, it is advantageously possible for the axis of folding to be inclined with respect to the axis of the rotor by an angle of inclination that is the same for all the blades of the rotor.

However, in order better to meet the requirements and constraints associated with folding, it may be preferable for the blades of the rotor to belong to at least two families of blades pivoting about axes of folding which are inclined at different angles of inclination so that the axes of folding of all the blades of each family have the same angle of inclination, which differs from the angle of inclination of the axes of folding of the blades of each other family.

In cases where the axis of folding and the pitch axis of each blade are secant, it is advantageous for each axis of folding to be inclined in the radial plane passing through the axis of the rotor and the pitch axis of the corresponding blade.

However, in the case, which is more frequent, in which the axis of folding of at least one blade is offset laterally with respect to the pitch axis of this blade, on the side to which this blade is folded, it is advantageous for the corresponding axis of folding to be inclined in a plane parallel to the radial plane passing through the axis of the rotor and through the said pitch axis.

In all cases, a small angle of inclination of the axis of folding with respect to the axis of the rotor may be suitable and, advantageously, this angle of inclination is smaller than 15°, possibly 10°, and is preferably between about 3° and about 9°.

If the rotor is of the known type, with automatic folding, in which each blade is secured by its root to a blade-folding fitting mounted so that it can pivot on the corresponding connecting member about the axis of folding, it is advantageous for the angle of inclination between the axis of folding and the axis of the rotor to be between about 6° and about 9°, and preferably to be of the order of 7° to 8°.

Furthermore, if this rotor is such that, in the way known per se, the fitting comprises an outer radial clevis in which the blade root is held by two pins which are substantially mutually parallel and symmetric with one another one on either side of the pitch axis of the corresponding blade, it is advantageous for the longitudinal axis of each pin to be inclined with respect to the axis of the rotor in a plane substantially parallel to a radial plane passing through the axis of the rotor and through the pitch axis, the said axis of the pin converging towards the axis of the rotor on the opposite side to the rotor mast, with an angle of inclination which is smaller than the angle of inclination of the axis of folding.

By contrast, if the rotor is of the known type with manual folding, in which the outer radial part of each connecting member is arranged as an outer clevis, in which the root of the corresponding blade is held by two pins which are substantially mutually parallel and symmetric with one another one on either side of the pitch axis of the corresponding blade, and one of which is removable to allow the blade to be folded by pivoting about the other pin, it is advantageous for the longitudinal axis of the pivot pin to be the axis of folding inclined with respect to the axis of the rotor.

However, whether the root of each blade is held by two pins in a clevis of the corresponding connecting member or of a fitting mounted so that it can pivot about the axis of folding on the corresponding connecting member, it is advantageous for the angle of inclination of the longitudinal axis of at least one pin with respect to the axis of the rotor to be between about 3° and about 6°, and preferably to be of the order of 4° to 5°.

BRIEF DESCRIPTION OF THE SEVERAL VIEWS OF THE DRAWINGS

Other advantages and features of the invention will emerge from the description given hereinbelow, with no implied limitation, of some embodiments which are described with reference to the appended drawings in which:

FIG. 4 is a diagrammatic geometric depiction of the path of a blade of the known rotor of FIG. 1, in which the axis of folding is inclined in a plane perpendicular to the pitch axis of the blade in the flight position, FIGS. 5 and 6 are views respectively along the axis Ox and along the axis of folding BB of FIG. 4.

DETAILED DESCRIPTION OF THE INVENTION

Figure 1:
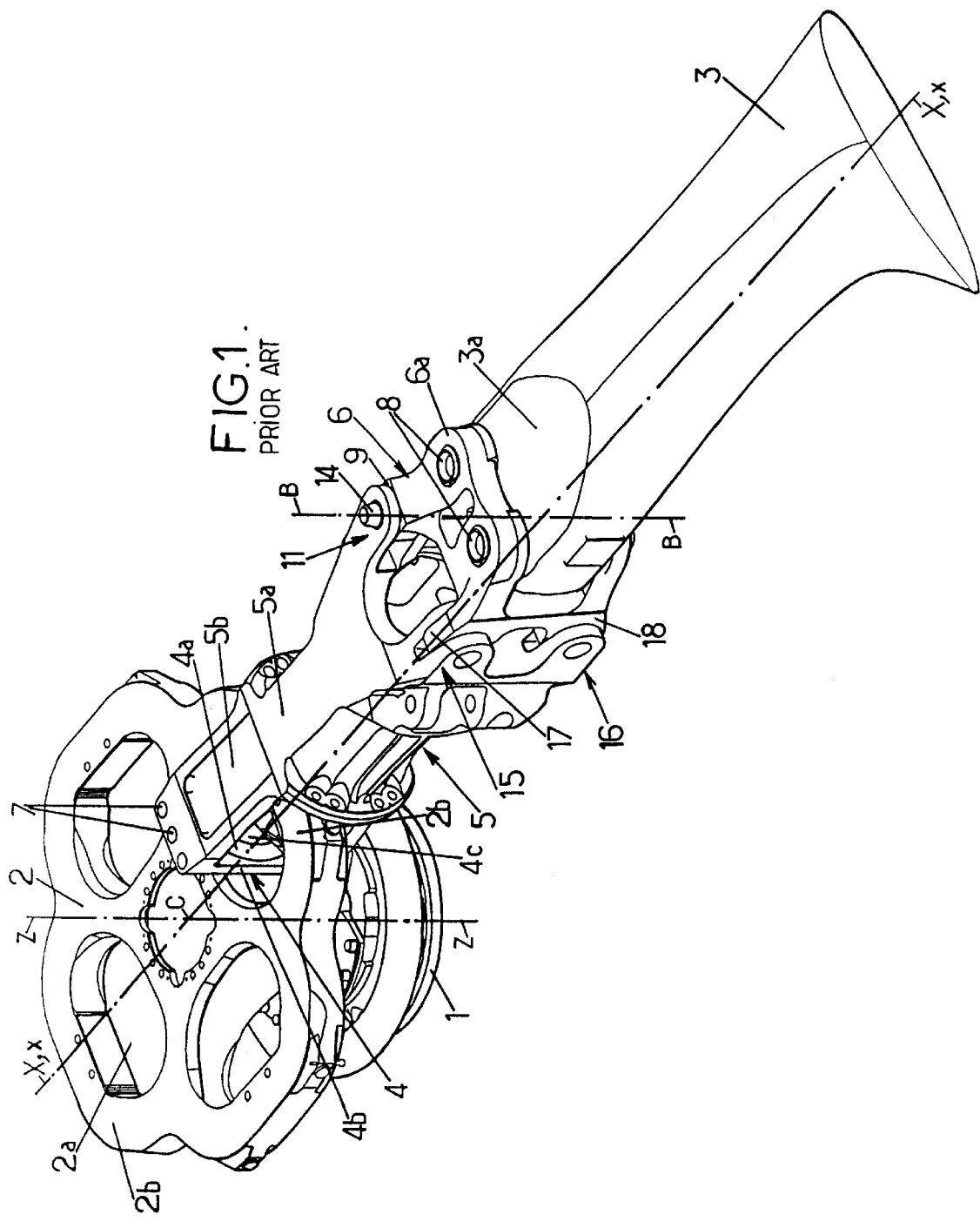
FIG. 1 is a perspective partial diagrammatic view of the head of a four-bladed rotor with automatic folding of the state of the art, and in which just one blade has been depicted, connected to the hub by a cuff-type connecting member with a blade-folding fitting in which the blade root is held, the blade and the fitting being deployed in the flight position.

FIG. 1 partially depicts the head of a four-bladed helicopter main rotor, in which the tubular rotor mast 1 is secured, via its upper part, to a hub 2 that turns with it about the axis of rotation ZZ that passes through the centre C of the rotor. The hub 2 is arranged as a radial plate (with respect to the axis ZZ) with cavities, there being, for each blade 3 of the rotor, a cavity 2a passing axially through the hub plate 2 in order partially to house means 4 of holding and articulating to the hub 2a member 5 for connecting the hub 2 to the corresponding blade 3 via a blade-folding fitting 6 that holds the blade 3 and is mounted so that it can pivot about an axis of folding BB in a fixed position on the member 5.

This connecting member 5, known as a cuff in the remainder of the description, because its central part 5a is tubular, is arranged more or less radially with respect to the axis ZZ of the rotor, and its inner radial end part is arranged as an inner clevis 5b, the two parallel branches of which provide the connection with the retaining and articulating means 4.

In the known way, these means 4 comprise a laminated spherical stop, with a central part 4a made up of an alternating stack of layers of an elastically deformable material and of cups made of a rigid material in the shape of portions of spheres between, on the one hand, an inner radial armature 4b passing through cavity 2a and fixed as a spacer piece between the branches of the inner clevis 5b by threaded rods depicted diagrammatically as 7 and, on the other hand, an outer radial armature 4c straddling the outer radial edge 2b of the corresponding cavity 2a of the hub 2 and fixed to this edge 2b of the hub by threaded rods (not depicted).

The root 3a of the blade 3 is held between the two parallel branches of an outer radial clevis 6a of the fitting 6 by two pins 8 which are mutually parallel and more or less parallel to the axis ZZ of the rotor, and symmetric about the common longitudinal axis XX of the fitting 6 and of the blade 3, being more or less perpendicular to this longitudinal axis XX which is the pitch-change axis of the blade 3 and passes close to the centre C of the rotor on the axis of rotation ZZ when the blade 3 is in the flight position.

In an alternative form with manual folding of the rotor of FIG. 1, the two pins 8 hold the blade root 3 in an outer radial clevis, not of the fitting 6, which is not present, but directly in the outer radial end part of the cuff 5, and one of the pins 8 is removable so that the blade 3 can be folded manually, after the rotor has stopped, by pivoting it with respect to the cuff 5, and therefore to the hub 2, about the other pin 8, the longitudinal axis of which then constitutes the geometric axis BB of manual folding of the blade 3. If the blade 3 of FIG. 1 is assumed to point forwards and to the right of the helicopter, it is folded to the right-hand side, towards the rear, about the pin 8 furthest to the right, depicted to the left in FIG. 1, the other being removable, whereas if the blade 3 is assumed to point forwards and to the left of the helicopter, it is pivoted backwards to the left hand side about the pin 8 furthest to the left, depicted to the right in FIG. 1, after the other pin 8 which is removable has been removed.

However, in the rotor of FIG. 1 with a blade-folding fitting 6, the blade 3 can be folded automatically using an actuator, not visible in this FIG. 1, housed in the central part 5a of the cuff 5 and controlling the rotations of the fitting 6 and of the blade 3 about the axis of folding BB with respect to the cuff 5.

For its pivoting connection with the cuff 5, the fitting 6 has at least one lateral bearing 9, offset laterally to one side of the axis XX, each bearing 9 consisting, for example, of a lug of cylindrical overall shape projecting axially from the opposite side to the clevis 6a. The cuff 5 also has at least one bearing 11, coaxial with the bearing 9 about the axis of folding BB and offset laterally on the cuff 5 on the same side of its longitudinal axis XX as the bearing 9 on the fitting 6. Each bearing 11 may be formed by a lateral and outer radial pivot clevis projecting more or less radially outwards from the outer radial part of the cuff 5, and in such a way that each bearing such as 9 of the fitting 6 is journal-mounted in such a pivot clevis which forms a corresponding bearing 11 on the cuff 5, about a pivot 14 held in the bearings 9 and 11 coaxially with the axis of folding BB.

To lock the fitting 6 in the flight position (FIG. 1) on the cuff 5, the latter also has, on the opposite side to the bearing 11 with respect to its longitudinal axis CX, two locking devises 15 and 16, which are lateral and project more or less radially outwards from the outer radial end part of the cuff 5. The two branches, pointing more or less parallel to the radial plane passing through the axis of the rotor ZZ and through the longitudinal axis CX of each clevis 15 or 16 have coaxial bores passing through them intended to receive locking pins of a stage for locking the manoeuvring actuator, not depicted.

To cooperate with these devises 15 and 16, the fitting 6 has, on the opposite side to its lateral bearing 9 with respect to the longitudinal axis CX, two lateral tabs 17 and 18 projecting, parallel to this longitudinal axis CX, from the opposite side to the clevis 6a. Each of the tabs 17 and 18 is pierced with a transverse bore, which is aligned with the coaxial bores of the branches of the corresponding clevis, 15 or 16, as, in the deployed position of the blade, or flight position (FIG. 1), each tab 17 or 18 is housed in the recess delimited in the corresponding locking clevis 15 or 16 until the fitting 6 and the cuff 5 butt up against one another. In this position, each tab 17 or 18 can be held in the corresponding locking clevis 15 or 16 by a cylindrical locking pin passing through their aligned bores and axially retractible by a locking actuator, an electromechanical one for example, which is housed, as already stated hereinabove, in the body of the manoeuvring actuator.

For further details on the construction of the manoeuvring actuator and the way in which it is fitted to cuff 5 and on the construction of the bearings 9 and 11 and of the devises 15 and 16 and locking tabs 17 and 18 of the cuff 5 and of the fitting 6, reference will advantageously be made to U.S. Pat. No. 5,782,606 of the assignee company, the description of which is incorporated into this text by way of reference.

Like in the aforementioned application, after the tabs 17 and 18 have been unlocked in the devises 15 and 16, the manoeuvring actuator housed in the cuff 5 allows the fitting 6 and the blade 3 to pivot through a maximum angle of the order of 130° to 135° about the axis of folding BB between the flight position (FIG. 1), in which the pitch axis of the blade 3 is aligned with the longitudinal axis CX of the cuff 5, the blade 3 and the fitting 6 being radially in line with the cuff 5, and the folded position, in which the blade 3 and the fitting 6 are folded back, by pivoting, towards the rear of the helicopter on that side of the sleeve 5 towards which the pivot 14 of the articulation for folding is offset.

For the front blades to have a path that brings them under the rear blades, during folding, it has already been proposed for the axis of folding BB to be inclined with respect to the direction parallel to the axis of the rotor ZZ in the plane perpendicular to the pitch axis CX of each blade 3 in a rotor with folding blades of structure similar to that of FIG. 1.

The path about an axis of folding BB thus inclined is explained with the aid of FIG. 4, in which the orthogonal reference frame CXYZ is centred on the centre C of the rotor, the axis CZ being the axis of rotation of the rotor and the axis CX the pitch axis of a blade in the flight position. To simplify the geometric analysis, a number of simplifying assumptions are made: it is assumed that the centre O of the blade-folding pivot is on the pitch axis CX, although it is generally offset by a few centimeters to the side of this axis towards which the blade will be folded, as described hereinabove with reference to FIG. 1. The orthogonal reference frame Oxyz is thus parallel to the reference frame CXYZ starting from a centre O which is offset on the pitch axis CX. Reference will be made to the plane of the rotor CXY, assumed to be horizontal, whereas in general the rotor mast of axis CZ (perpendicular to the plane of the rotor) is not exactly vertical, and the pre-drag angle (of a few degrees) of the blades is disregarded, also assuming that the position of the blades in terms of flapping is neutral (in the plane of the rotor), whereas in actual fact the rear blades will have a very slight negative angle of flapping because they are resting on lower anti-flap stops, and the front blades will have a slight positive angle of flapping, because they are resting on upper anti-flap stops, at the the end of folding. It is further assumed that each blade is infinitely rigid, and no account is taken of the inherent deformation of the blade corresponding to the maximum load factor that results from movements of the deck of the ship and/or gusts of wind, all of which can cause a deflection of up to one meter at the tips of some blades. Finally, it is assumed that the blade pins, such as the pins 8 in FIG. 1, are perpendicular to the chord of the reference profile of the blade (generally chosen at 0.7R where R is the span of the blade), and that these pins are therefore more or less vertical at minimum collective pitch, which assumes counter-twisting of the neck of the blade, connecting the blade root 3a to the profiled main part of the blade 3.

The axis of folding BB is inclined by an angle β in the plane yOz perpendicular to the pitch axis Ox of the blade in the flight position. The axis of the blade describes a plane perpendicular to the axis of folding BB and passing through O, that is to say the plane xOy'. For an angle of rotation α of the blade in the course of folding, the drop h of the tip of the blade with length L, with respect to the plane XCY of the rotor has the value:

$$h = L \cdot \sin \beta \cdot \sin \alpha.$$

It will immediately be understood that the path of the blade is upwards, that is to say that h decreases, when α exceeds 90°.

The reference profile of the blade, generally taken at 0.7R, but depicted in FIG. 4 at the blade tip, sees its angle of incidence i with respect to the plane of the rotor XCY or xOy vary with the angle of folding α.

If M is the tip of the blade of length L in the plane it describes and N is the projection of M on Oy perpendicular to Oy' (see FIGS. 4, 5 and 6), then the angle of incidence i that the tangent to the path of the blade tip M makes with the plane of the rotor xOy is such that:

$$\tan i = -\frac{MN}{MD}$$

where D is the intersection of Ox with the said tangent. Since $$MN = -\frac{h}{\cos \beta} = L \cdot \tan \beta \cdot \sin \alpha \text{ and}$$

MD=L.tan α then: tan i=−tan β.cos α.

Because both the leading edge and the trailing edge of the blade are just as likely to be on the side to which the blade is folded, their position with respect to the direction of folding is not taken into consideration for the time being, especially since the wind can come from any direction whatsoever. By contrast, we do need to make a distinction between manual folding and automatic folding.

In the case of manual folding, in the alternative form of rotor of FIG. 1 described hereinabove, where the blade 3 is held by the two pins 8 directly in a clevis of the cuff 5, one of the pins 8 being removable to allow folding by pivoting about the other pin 8, the pin 8 acting as a pivot is inclined at the same time as the blade 3 by an angle β before it is folded. Thus the initial incidence iO=−β, and i=−tan$^{-1}$(cos α.tan β)

This initial condition is more or less satisfied in hubs where the pitch articulation is mounted on bearings, and therefore when folding takes place at minimum collective pitch.

If the pitch articulation contains an elastic component, such as a laminated spherical stop, as is the case in the example of FIG. 1, or a torsion bundle or flexible blade or flexible arm, which is normally preset in terms of pitch, then folding takes place after the blades have been given a mean collective pitch, which means that the permanent tension on the elastic component of the front blades is minimal, in the knowledge that they will have to be inclined symmetrically and by an angle which will be greater the higher the number of blades on the rotor. For this reason, it is complicated to fold five blades, or even six blades, and this is true without taking account of other environmental constraints, such as the presence of covers over the top rear part of the fuselage.

In the case of automatic folding, with a rotor like the one in FIG. 1, and in which the axis of folding BB of each blade is inclined in a plane perpendicular to the pitch axis CX of the blade, the goal is to obtain appropriate paths for the blades with a natural position of the controls, for example with minimum collective pitch and neutral cyclic pitch. It will be understood that each cuff 5 has a specific geometry, because the blade-folding pivot 14 is offset towards the leading edge for the two blades on one side and towards the trailing edge for the two blades on the other side, and that an inclination of the axis of folding BB in terms of pitch β (in a plane perpendicular to the pitch axis CX) which differs between the front blades and the rear blades is needed.

In this case, the initial incidence iO is close to zero for all the blades, and i=β−tan$^{-1}$(cos α.tan β).

The angle of inclination in pitch β of the axis of folding may reach high values, up to 27° on the front blades of a rotor with six folding blades, and more than 20° on those of a five-bladed rotor.

For an angular travel of the order of 130° in folding, the incidence at the end of folding of the front blades is therefore of the order of 40 to 45°, which means that the blade presents a very large area exposed to the wind.

Furthermore, these front blades pass relatively close to the ground or to the deck.

Figure 2:
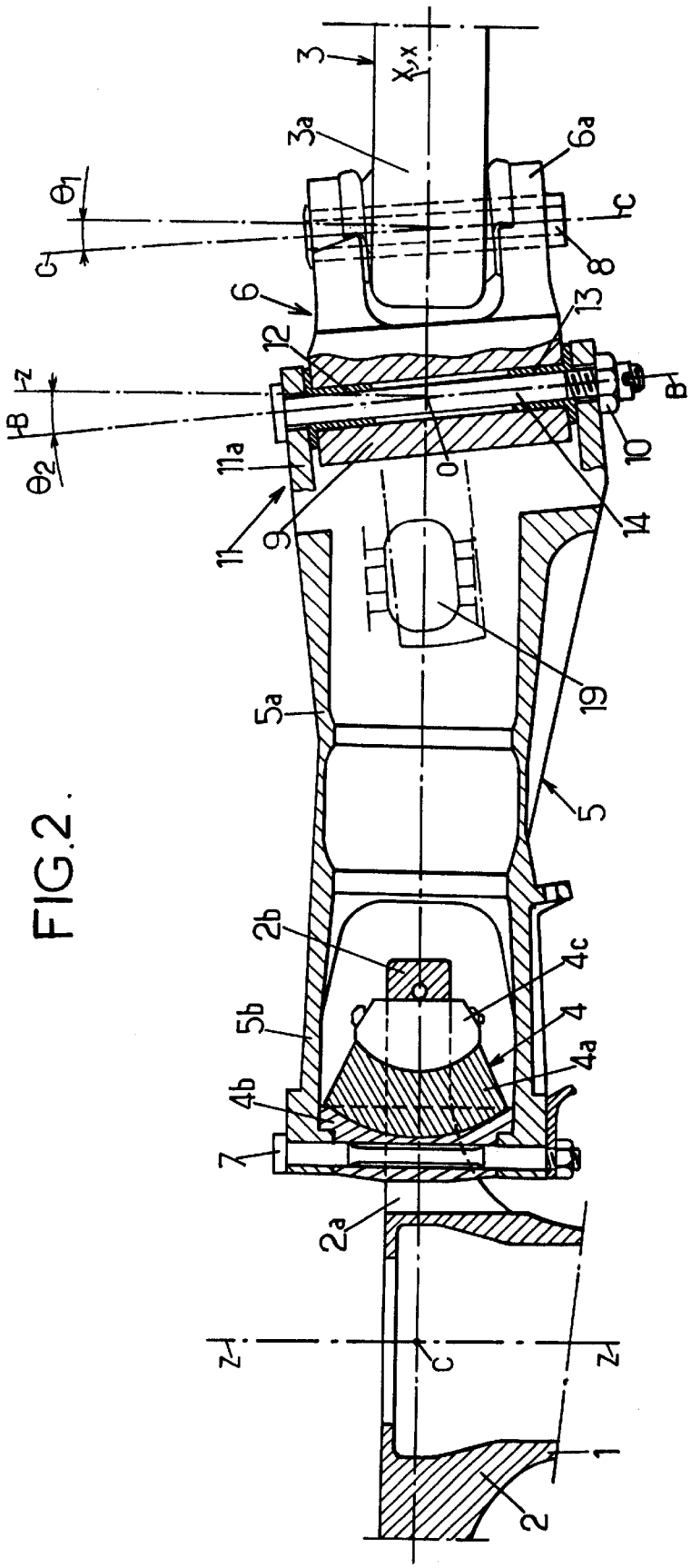
FIG. 2 depicts, partly in radial section and partly in side elevation, a rotor head of the type shown in FIG. 1, but in which the axis of folding and the axes of the pins holding the blade in the blade-folding fitting are inclined in substantially radial planes, according to the invention.
Figure 3:
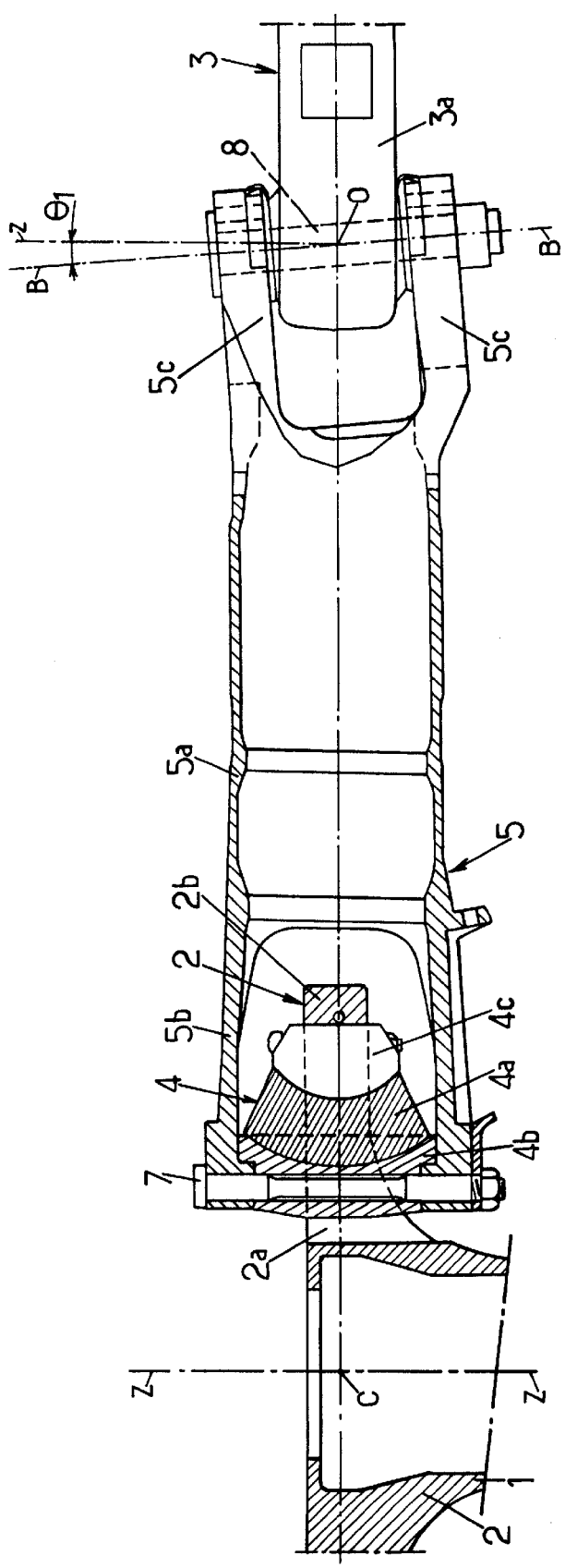
FIG. 3 is a view similar to FIG. 2 for the head of a four-bladed rotor with manual folding, in which each blade is held in a clevis of the connecting cuff by means of two pins, one of which is removable and the other of which is a pivot pin, with axes inclined in a substantially radial plane.

To overcome the drawbacks of such known embodiments, the invention proposes to incline the axis of folding in a substantially radial plane, both on a rotor with automatic folding of the blades, like in FIG. 2, and on a rotor with manual folding, like in FIG. 3.

The rotor with automatic folding of FIG. 2, is very similar in structure to the rotor of FIG. 1, which means that the same numerical references are used to denote the same components. However, it can be differentiated therefrom by two essential geometric differences.

The first is that the two pins 8, which are mutually parallel and symmetric with one another one on either side of the pitch axis CX of the blade 3, and which hold the blade root 3*a* in the outer clevis 6*a* of the blade-folding fitting 6, are no longer perpendicular to the pitch axis CX of the blade 3 and parallel to the axis of the rotor CZ, as they were in the example of FIG. 1, but on the contrary are inclined with respect to the axis of the rotor CZ, the longitudinal axis CC of each pin 8 being in a plane parallel to the radial plane passing through the axes CX and CZ and inclined in this parallel plane so that axis CC converges towards the axis of the rotor CZ, on the opposite side to the rotor mast 1, that is to say towards the top in FIG. 2. The angle of inclination θ1 of the longitudinal axis CC of each pin 8 with respect to the axis of the rotor CZ is between about 3° and about 6°, and is preferably of the order of 4° to 5°.

The other difference is that the axis of folding BB, defined by the pivot 14 of the pivoting articulation of the blade-folding fitting 6 on the cuff 5 is no longer contained in a plane perpendicular to the pitch axis CX of the blade 3 and parallel to the axis of the rotor CZ or inclined in this perpendicular plane, but the axis of folding BB extends in a substantially radial plane passing through the axis of the rotor CZ and being inclined with respect to this axis so that it converges towards this axis CZ on the opposite side to the rotor mast 1, this angle of inclination θ2, depicted in FIG. 2, exceeding the angle of inclination θ1 of the longitudinal axes CC of the pins 8, and being between about 6° and about 9°, and preferably of the order of 7° to 8°.

In FIG. 2, the axis of folding BB and the pitch axis CX of the blade 3 may converge at O, the centre of the pivot 14, in which case the axis of folding BB is inclined in the radial plane passing through the axis of the rotor CZ and through the pitch axis CX of the blade 3.

However, in general, like in the example of FIG. 1, the pivot articulation 14 is offset laterally to one side of the pitch axis CX of the blade 3, to the side to which this blade 3 is folded, in which case the axis of folding BB is inclined in a plane parallel to the radial plane passing through the axis of the rotor CZ and through the pitch axis CX of the blade 3.

In both cases, the blade-folding articulation may consist of the bearing 9 of the fitting 6, in the form of a cylindrical sleeve engaged between the two branches 11*a* of a clevis constituting the bearing 11 of the cuff 5 at its outer radial end, the pivot 14 for example being a stud passing through coaxial bores in the branches 11*a* of the clevis 11 and in the bearing 9, in which it is guided by stepped rings 12 and 13, and onto the threaded lower end of which a pinned nut 10 is screwed.

Finally, depicted diagrammatically as 19 in FIG. 2 is an actuator housed in the cuff 5 and controlling the manoeuvres of the fitting 6 and of the blade 3 in pivoting about the axis of folding BB, during folding and during deployment of the blade into the flight position.

The rotor with manual folding in FIG. 3 has a structure very similar to that of the alternative form with manual folding, described hereinabove, of the rotor of FIG. 1, that is to say that the blade root 3*a* is held directly by the two pins 8 in an outer clevis of the cuff 5. For this reason, the analogous components of the rotor are identified by the same numerical references, and the description below is restricted to that of the only main difference of FIG. 3.

One of the two pins 8 holding the blade root 3*a* in the outer clevis 5*c* of the cuff 5 is removable so that the other pin 8 constitutes, on the side to which the blade 3 is folded, a pivot pin for this blade. These two pins 8 are mutually parallel and symmetric with one another one on either side of pitch axis CX of the blade 3, but the longitudinal axis of the pivot pin, which constitutes the axis of folding BB of the blade 3, extends in a radial plane passing through the axis of the rotor CZ and is inclined in this plane so that it converges towards the axis of the rotor CZ on the opposite side to the rotor mast 1, the angle of inclination θ1 in FIG. 3 preferably being the same as it is in FIG. 2, that is to say being between about 3° and about 6° and preferably of the order of 4° to 5'.

By inclining the axis of folding BB in a substantially radial plane, with an angle of inclination which, in the majority of cases, may be between about 3° and about 9°, the paths of the blades during folding can be controlled with far fewer drawbacks than if each blade were to be folded about an axis inclined in a plane perpendicular to its pitch axis. The geometric analysis of the path of a blade folded about an axis inclined in a radial plane is described hereinbelow with reference to FIGS. 7 to 9, adopting the same simplifying assumptions as before, with reference to FIGS. 4 to 6.

Figure 8:
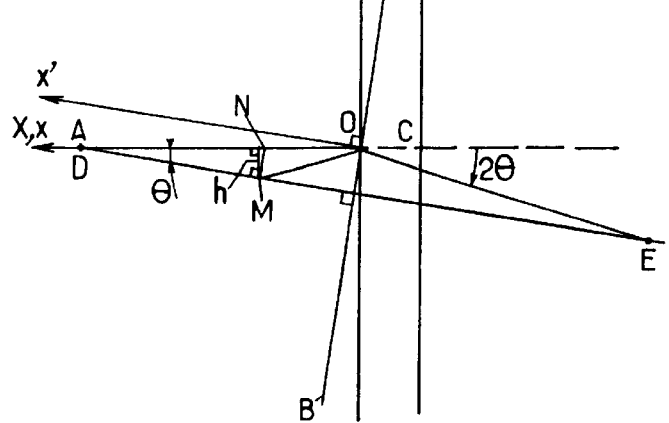
FIGS. 8 and 9 are views respectively along the axis Oy and along the axis of folding BB of FIG. 7, FIGS. 10 and 11 are graphs in which the two curves depict a comparison of the change in the drop of the tip of a blade and of the incidence, respectively, as a function of the angle of folding, for rotors with automatic folding according to FIGS. 1 and 2, and FIGS. 12 and 13 are graphs respectively similar to FIGS. 10 and 11 for rotors with manual folding, according to an alternative form of FIG. 1 without a blade-folding fitting and according to FIG. 3, respectively.
Figure 9:
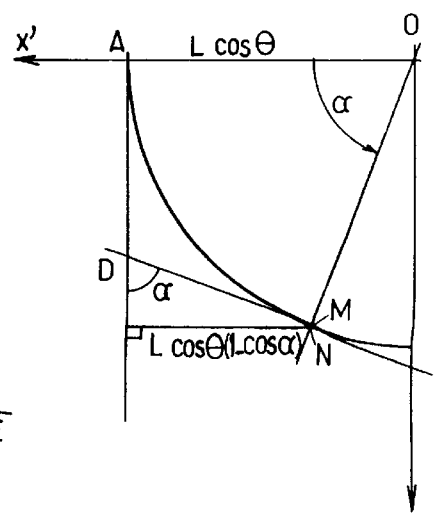

The axis of folding BB is therefore inclined by an angle $\theta$ in the radial plane XCZ or xOz. The axis of the blade 3 therefore describes a cone of vertex O, the centre of the pivot, and vertex half-angle $$\pi/2-\theta$$

and the end M of the blade covers a circle in a plane perpendicular to the axis of folding BB (see FIG. 8). The end M of the blade covers the path AE between its initial flight position and its theoretical position of maximum folding for an angle of rotation of 180°. For an angle of rotation $\alpha$ of the blade in the course of folding, the drop h of the tip of the blade of length L, with respect to the plane XCY or xOy of the rotor has the value:

$$h=L(1-\cos \alpha). \sin \theta \cos \theta.$$

Figure 7:
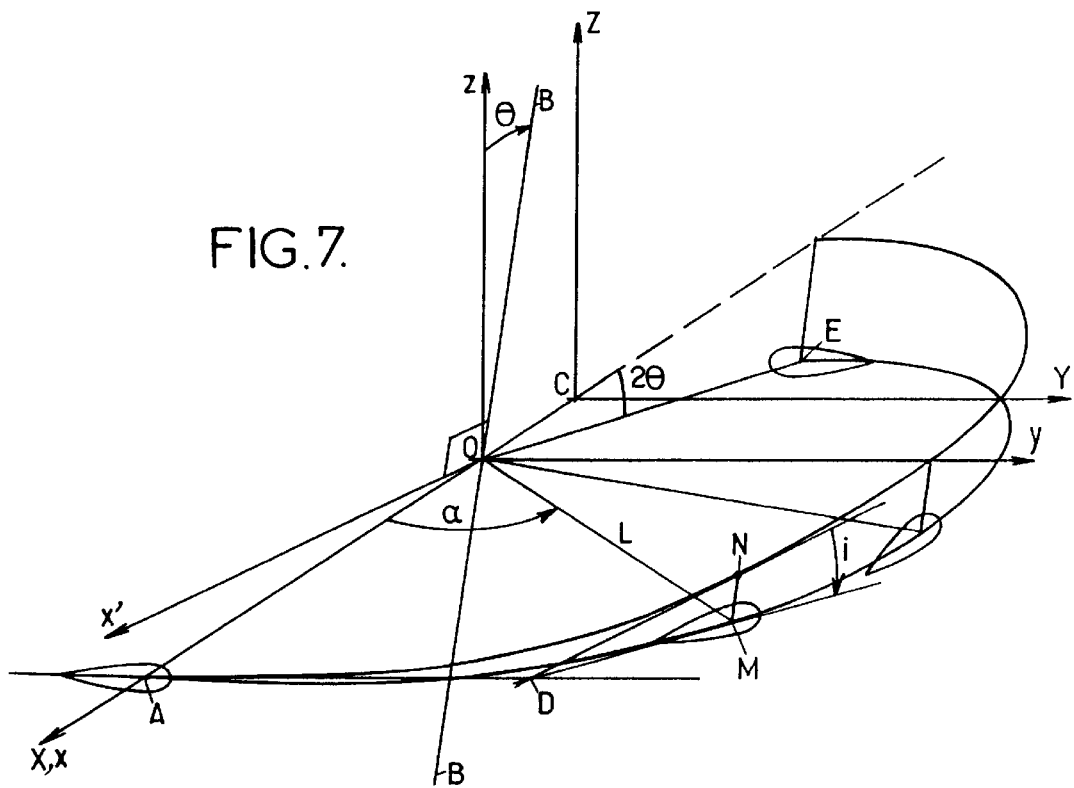
FIG. 7 is a view similar to FIG. 4 for a rotor according to FIG. 2 or 3, in which the axis of folding is inclined in a substantially radial plane.

The reference profile of the blade, generally taken at 0.7R but depicted in FIG. 7, like in FIG. 4, at the blade tip, has an angle of incidence i with respect to the plane of the rotor xOy, the angle of incidence being measured in the plane tangential to a cylinder which has as its axis the axis of folding BB and rests on the base of the cone described by the blade, so that:

$$\tan i=-MN/MD$$

where $MN=L.\tan\theta.\cos\theta(1-\cos\alpha)$ and where $$MD=L \cos \theta. (1-\cos \alpha)/\sin \alpha$$

so that $\tan i=-\tan \theta.\sin \alpha$, this incidence i possibly needing to be corrected by an initial incidence i0.

The advantages of folding about an axis which is inclined in a radial plane are immediately and qualitatively apparent from three comments of a geometric nature: the path of each blade is continuously downwards; the incidence i with respect to the plane of the rotor XCY, which is more or less horizontal, varies far less than when folding about an axis which is inclined in a plane perpendicular to the pitch axis of the blade; and for large angular travels in folding, for example 130° for the front blades, the same position of blade axis is obtained for an angle of inclination $\theta$ in the radial plane which is about half the angle of inclination $\beta$ in pitch, that is to say in the plane perpendicular to the pitch axis of the blade.

In the case of automatic folding, if the embodiment of FIG. 2 is compared with that of FIG. 1 in which the axis of folding BB is inclined in pitch by an angle $\beta$ in the plane perpendicular to the pitch axis CX, and assuming a four-bladed rotor, an inclination in pitch $\beta$ of 15° for folding the front blades of the rotor of FIG. 1 is a good order of magnitude for obtaining satisfactory blade paths, in the absence of any constraint resulting from the folding of the rear end of the tail with the counter-torque rotor of the helicopter. If we look for the angle of inclination $\theta 2$ of the axis of folding BB in a radial plane (see FIG. 2) that gives the same blade position at the end of folding for an angular travel of about 125°, we get:

$$h=L \sin \beta. \sin \alpha=L(1-\cos \alpha) \sin \theta. \cos \theta,$$

which, for $\beta=15°$ and $\alpha=125°$, gives $$\sin \theta 2. \cos \theta 2=0.134733,$$

and hence $\theta 2=7.8°$.

The curves in FIG. 10 depict the compared change in drop h of the blade tip, that is to say of the distance between the blade tip and the plane of the rotor xOy, for a blade 7 m long, as a function of the angle $\alpha$ of folding, for the case in question, while the two curves in FIG. 11 depict the compared change in variation of incidence i during folding, as a function of the angle $\alpha$.

In FIG. 10, the curves 20 and 21 depict the change in drop h of the blade tip during automatic folding, respectively for an inclination $\beta$ of the axis of folding in pitch in the plane perpendicular to the pitch axis of the blade, and for an inclination $\theta 2$ in the radial plane, according to the invention. It may be observed that the inclination $\theta 2$ in a radial plane allows the blade to drop uniformly, instead of dropping swiftly then to travel back upwards as soon as a exceeds 90° with a known inclination $\beta$ in pitch, the upwards movement of the blade in this case being about 35 cm for $\alpha=125°$. However, what is more, as shown by the curves 22 and 23 in FIG. 11, which respectively depict variations in incidence for an inclination $\beta$ in pitch and for an inclination $\theta 2$ of the axis of folding in a radial plane, choosing a radial inclination $\theta 2$ allows the folding operation to take place with a small variation in incidence, because it has a maximum value of 7.8°, whereas an inclination $\beta$ of the angle of folding in pitch leads to a continuously increasing incidence which reaches 23.7° for $\alpha=125°$.

For a helicopter on a ship, if it is considered that movements of the deck of the ship cause variations in incidence by ±15°, and that the wind may act aerodynamically on a folded blade from its trailing edge or from its leading edge, values for the coefficient of lift Cz and coefficient of drag Cx are obtained, which are those in table 1 below at the end of the description, for the scenario taken as an example, for an inclination $\beta$ of the axis of folding in a plane perpendicular to the pitch axis and for an inclination $\theta 2$ of the axis of folding in a radial plane.

The advantages of an inclination $\theta 2$ of the axis of folding BB in a radial plane for automatic folding can be summarized as follows:

1) a continuously downwards path is obtained, and this increases the clearance between the blade tip and the ground or the deck from the side, and relieves the manoeuvring actuator at the beginning and end of travel, in folding and in deployment.

2) a sharp reduction in the area presented to the wind is obtained without at the same time obtaining maximum coefficients of lift and of drag Cz and Cx, and this on the one hand leads to a reduction in manoeuvring moments, by a factor of 2 to 3 depending on the combinations with accelerations resulting from the movements of the ship, and therefore a saving in power, mass and volume of the folding mechanism and, on the other hand, to a reduction in the forces applied to some of the parts surrounding the blades, such as the cuffs and pitch and drag locking devices, and to some parts of the blade, such as the blade fittings and necks, and therefore a saving in mass.

3) it is possible to have just two cuff geometries; one geometry for the cuffs on the left-hand side and one for the cuffs on the right-hand side of the rotor, and therefore two families of electrical and/or hydraulic equipment for the maneouvring actuators borne by these cuffs, because the same angle of inclination $\theta 2$ in the radial plane is suitable for a front blade, being folded through an angle α of about 125°, and for a rear blade being folded to the same side through an angle α of about 45°, which is thus always higher up than the corresponding front blade.

4) when lashing down the blades to the tail boom of the helicopter, using support poles fitted with grippers, in a known way, the risk of damaging the trailing edge of the blades, when this trailing edge is pointing downwards, is reduced.

In the case of manual folding, a comparison of the embodiment of FIG. 3 with the alternative form described in FIG. 1, in which the blade root 3a is attached directly to the cuff 5 by two pins 8 one of which is removable and the other of which is a pivot pin, whose longitudinal axis, which constitutes the axis of folding, is inclined by an angle β with respect to the angle of the rotor but in a plane perpendicular to the pitch axis of the blade, leads to the following observations. Assuming a four-bladed rotor, if we look for the angle θ1 (see FIG. 3) of inclination of the axis of folding BB in a radial plane and corresponding at the end of folding, for α=125°, to an inclination β in pitch of the pivot pin 8 of 9°, we get, for β=9° and α=125°, sin θ1·cosθ1=0.081433, which gives θ1=4.69°.

Figure 12:
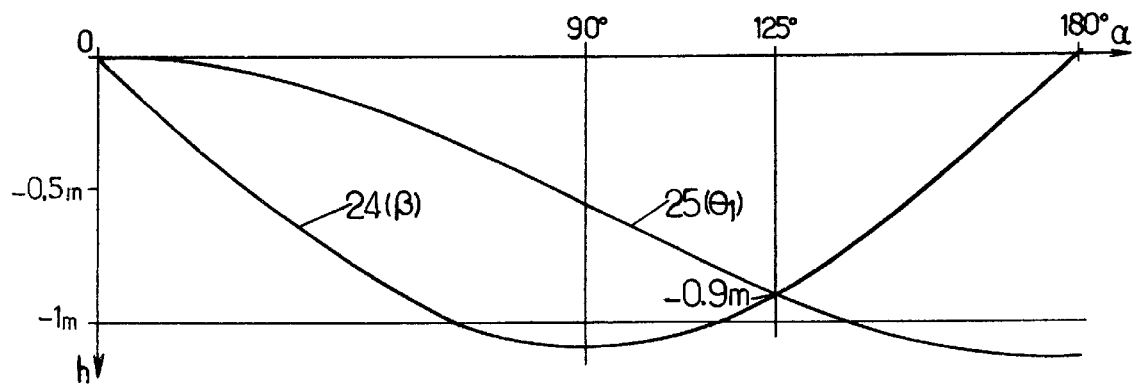
Figure 13:
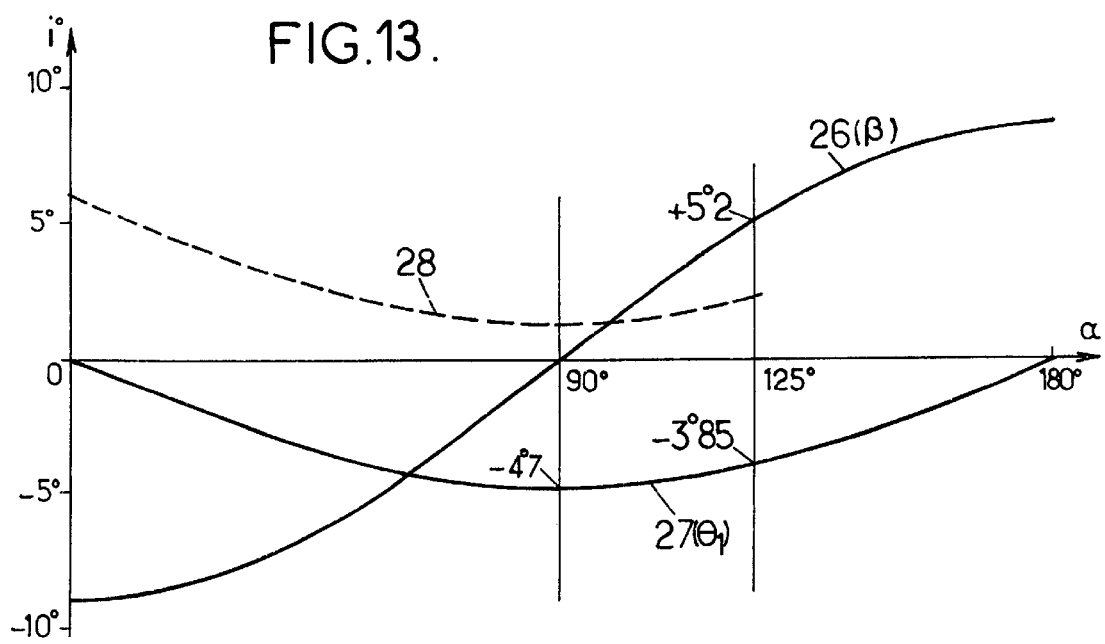

The two curves 24 and 25 of FIG. 12 correspond to the curves 20 and 21 of FIG. 10 and depict the variations in drop of the blade tip respectively for an inclination β in pitch and for a radial inclination θ1 of the axis of folding, and the two curves 26 and 27 of FIG. 13 are analogous with the curves 22 and 23 of FIG. 11 and depict variations in incidence respectively for an inclination β in pitch and a radial inclination θ1 of the axis of folding, as a function of the angle α of folding. For the variation in incidence i in manual folding and for an inclination β in pitch of the angle of folding, it was shown earlier that $$i = -\tan^{-1}(\cos\alpha \cdot \tan\beta).$$

Under the same conditions as before, depending on whether the wind attacks the folded blade from the leading-edge side or from the trailing edge side, and depending on whether this wind is horizontal or has an incidence of ±15°, the coefficients of lift Cz and drag Cx for the two types of inclination, in pitch and radial, of the axis of folding, during manual folding, are shown in table 2 hereinbelow at the end of the description.

A study of table 2 shows that the differences between the two types of inclination, in pitch or radial, are far smaller in manual folding than in automatic folding. As the maximum wind speeds allowed for manual folding are far lower than for automatic folding, the maximum coefficient of lift Cz is no longer a deciding factor. By contrast, in the case of non-horizontal wind, it can be seen that the inclination β in pitch of the axis of folding gives drag forces Cx which are far higher (+50%), which combine with a far steeper slope of path at the beginning of folding or at the end of unfolding, all of which is liable to hamper considerably the operation of extracting or of re-fitting the removable pin 8, the one not used as a pivot of the blade 3. In point of fact, the ability of a man on the ground or on the deck of a ship to apply more or less horizontal manoeuvring forces to a blade which is more than 3 meters from the ground or from the deck is fairly limited.

Thus, in manual folding, the advantages of an inclination θ1 of the axis of folding in a radial plane are as follows:

1) the blades are far easier to handle, from a kinematic point of view, in a path which drops uniformly, and with less variation in incidence of the blade with respect to a pole with gripper used for folding the blade.
2) the blades are easier to handle in terms of forces, mainly at the beginning of folding and at the end of unfolding, and at the end of folding, because of the slopes of path which are more favourable with respect to gravity, but also because of the lower area exposed to the wind, especially in the case of swirling wind.
3) from the constructional point of view, one and the same angle θ1, of a few degrees, for example 4 to 5°, for the inclination of the axis of folding in the radial plane is suitable for all the blades, which means that folding is possible with a mechanism for locking the blades in pitch which is identical for all the blades, and with a neutral cyclic pitch, the swashplates being horizontal, which means that it is not necessary to disconnect one or more pitch rods. All that is needed is for the desired collective pitch to be chosen so that there is no permanent torsion when the retaining and articulating means define a pitch articulation with elastic return in torsion, as is the case with a laminated spherical stop. The curve 28 of FIG. 13 in this respect gives the variation in incidence with an axis of folding inclined in a radial plane and for a pre-set twist of 6°, and this curve 28 shows that the earlier conclusions, in the absence of pre-set twist, remain valid. Finally, were one to choose to apply a permanent torsion to the pitch articulations with elastic return, this permanent torsion would be the same for all the blades.

We have considered above the advantageous embodiment in which the axis of folding is inclined with respect to the axis of the rotor by one and the same angle of inclination for all the blades of the rotor. However, in order better to meet the requirements and constraints associated with folding, particularly when the rotor has a great many blades, the rotor blades may be grouped into a number of families of blades pivoting about axes of folding which are inclined by one and the same angle of inclination for all the blades in one and the same family, this angle differing from the angle of inclination of the axes of folding of the blades of each of the other families. For example, for a given rotor, this rotor may have n blades pivoting about n axes of folding inclined by a certain angle θn, and m other blades pivoting about m axes of folding inclined by another angle θm, the number of families not being limited to two, which means that the rotor may also, possibly, comprise numbers p and q of blades, the axes of folding of which are inclined by an angle θp or θq respectively, in order to obtain an appropriate tapering of the collection of blades folded towards the back of the helicopter.

It will be understood that in manual folding just as in automatic folding, an inclination of the axis of folding in a substantially radial plane and in such a way that the axis of folding converges towards the axis of the rotor on the opposite side to the rotor mast makes it possible considerably to reduce the forces during folding and to simplify the procedure, and the structure of the rotor head. Furthermore, it is apparent from the foregoing that it is advantageous to give the blade pins a slight inclination in a substantially radial plane for manual folding, and to give the axis of automatic folding a slightly greater radial inclination, as shown by the angles θ1 and θ2 in FIGS. 2 and 3.

TABLE 1

|  |  | From leading edge | | From trailing edge | |
| --- | --- | --- | --- | --- | --- |
|  |  | Cx | Cz | Cx | Cz |
| Inclination of the axis of folding in a plane perpendicular to the pitch axis | Wind: −15 | 0 | 0.75 | 0.15 | 0.8 |
|  | Wind Horizontal | 0.45 | 0.85 | 0.45 | 0.66 |
|  | Wind: +15+ | 1 | 1.2 | 1 | 1.1 |
| Inclination of the axis of folding in a RADIAL plane. | Wind: −15° | 0 | 0.88 | 0.15 | 0.8 |
|  | Wind Horizontal | 0 | 0.65 | 0.1 | 0.66 |
|  | Wind: +15 | 0.35 | 0.8 | 0.35 | 0.65 |

TABLE 2

|  |  | From leading edge | | From trailing edge | |
| --- | --- | --- | --- | --- | --- |
|  |  | Cx | Cz | Cx | Cz |
| Inclination of the axis of folding in a plane perpendicular to the pitch axis | Wind: −15 | 0 | 0.55 | 0.08 | 0.54 |
|  | Wind Horizontal | 0 | 0.93 | 0.14 | 0.8 |
|  | Wind: +15° | 0.43 | 0.85 | 0.48 | 0.6 |
| Inclination of the axis of folding in a RADIAL plane. | Wind: −15° | 0 | 1 | 0.14 | −0.8 |
|  | Wind Horizontal | 0 | 0.44 | 0.08 | −0.45 |
|  | Wind: +15 | 0.29 | 0.8 | 0.3 | 0.6 |

What is claimed is:

1. Rotor with folding blades for the rotary wings of an aircraft, comprising a hub secured to one end of a rotor mast intended to be rotated about an axis of the rotor, and to which hub each blade of the rotor is connected by a connecting member which is substantially radial with respect to the axis of the rotor, said connecting member being connected to the hub by retaining and articulating means allowing angular excursions of the corresponding blade with respect to the hub at least in terms of pitch about a longitudinal pitch-change axis of the blade, each blade being mounted so that said blade can pivot with respect to the corresponding connecting member about an axis of folding, so that said blade can be moved, when the rotor is stopped, between two positions, one of which is a flight position, in which the blade is substantially radially in line with said connecting member, and the other of which is a folded position, in which the blade is pivoted about the axis of folding to one side of said connecting member towards the rear of the aircraft, wherein said axis of folding is in a substantially radial plane passing through the axis of the rotor and is inclined with respect to the axis of the rotor so that said axis of folding converges towards the axis of the rotor on the opposite side to the rotor mast.

2. Rotor with folding blades according to claim 1, wherein the axis of folding is inclined with respect to the axis of the rotor by an angle of inclination that is the same for all the blades of the rotor.

3. Rotor with folding blades according to claim 1, wherein the blades belong to at least two families of blades pivoting about axes of folding which are inclined at different angles of inclination so that the axes of folding of all the blades of each family have the same angle of inclination, which differs from the angle of inclination of the axes of folding of the blades of each other family.

4. Rotor with folding blades according to claim 1, and such that the axis of folding and the pitch axis of each blade are secant, wherein each axis of folding is inclined in the radial plane passing through the axis of the rotor and the pitch axis of the corresponding blade.

5. Rotor with folding blades according to claim 1, and such that the axis of folding of at least one blade is offset laterally with respect to the pitch axis of the said blade on the side to which the said blade is folded, wherein said axis of folding is inclined in a plane parallel to the radial plane passing through the axis of the rotor and said pitch axis.

6. Rotor with folding blades according to claim 1, wherein the angle of inclination of the axis of folding with respect to the axis of the rotor is between about 3° and about 9°.

7. Rotor with folding blades according to claim 1, of the type with automatic folding, in which each blade is secured by its root to a blade-folding fitting mounted so that said fitting can pivot on the said corresponding connecting member about the said axis of folding, wherein said angle of inclination between the axis of folding and the axis of the rotor is between about 6° and about 9°.

8. Rotor with folding blades according to claim 7, wherein the fitting comprises an outer radial clevis in which the blade root is held by two pins which are substantially mutually parallel and symmetric with one another one on either side of the pitch axis of the corresponding blade, the longitudinal axis of each pin being inclined with respect to the axis of the rotor in a plane substantially parallel to a radial plane passing through the axis of the rotor and through the pitch axis, said axis of the pin converging towards the axis of the rotor on the opposite side to the rotor mast, with an angle of inclination which is smaller than the angle of inclination of the axis of folding.

9. Rotor with folding blades according to claim 8, wherein the angle of inclination of the longitudinal axis of at lease one pin with respect to the axis of the rotor is between about 3° and about 6°.

10. Rotor with folding blades according to claim 9, wherein said angle of inclination is of the order to 4° to 5°.

11. Rotor with folding blades according to claim 7, wherein said angle of inclination is of the order to 7° to 8°.

12. Rotor with folding blades according to claim 1, of the type with manual folding, in which the outer radial part of each connecting member is arranged as an outer clevis, in which the root of the corresponding blade is held by two pins which are substantially mutually parallel and symmetric with one another one on either side of said pitch axis of the corresponding blade, and one of which is removable to allow the blade to be folded by pivoting about the other pin, wherein the longitudinal axis of the pivot pin is the axis of folding inclined with respect to the axis of the rotor.

* * * * *